United States Patent [19]

Daly et al.

[11] Patent Number: 4,487,154
[45] Date of Patent: Dec. 11, 1984

[54] PRESSURE-ACTIVATED LOW PRESSURE WARNING DEVICE

[75] Inventors: James M. Daly, Kirkland; Gary L. Dusenberry, Redmond, both of Wash.

[73] Assignee: Rockcor, Inc., Redmond, Wash.

[21] Appl. No.: 434,574

[22] Filed: Oct. 15, 1982

[51] Int. Cl.³ .............................................. B60C 23/06
[52] U.S. Cl. ................................. 116/34 B; 73/146.2; 340/58
[58] Field of Search .................. 340/52 R, 58; 200/61.22, 61.23, 61.25; 116/34 A, 34 B, 34 R; 73/146, 146.2, 146.3

[56] References Cited

U.S. PATENT DOCUMENTS

| | | | |
|---|---|---|---|
| 3,154,048 | 10/1964 | Nue | 116/34 R |
| 3,472,197 | 10/1969 | Poole | 116/34 R |
| 3,489,998 | 1/1970 | O'Neal | 340/58 |
| 3,593,269 | 7/1971 | Richardson | 340/58 |
| 4,117,452 | 9/1978 | Snyder et al. | 340/58 |
| 4,201,147 | 5/1980 | Goshima et al. | 116/34 R |
| 4,235,184 | 11/1980 | Schiavone | 116/34 R |
| 4,353,322 | 10/1982 | Weglin et al. | 116/34 B |

FOREIGN PATENT DOCUMENTS 1447244  3/1974  United Kingdom .

Primary Examiner—Glen R. Swann, III
Attorney, Agent, or Firm—Dowrey & Cross

[57] ABSTRACT

A device for indicating a pressure drop or low pressure condition in a tire detects a pressure drop and makes an acoustic signal in response to the detection of the pressure drop. The device can include a strut for intermittently contacting a wall of a tire, a striker attached to the strut for striking the wheel rim, and a pressure-activated latch for preventing the strut from contacting the wall or the tire when the pressure in the tire is above a predetermined value by holding the strut tangent to the wheel rim.

16 Claims, 6 Drawing Figures

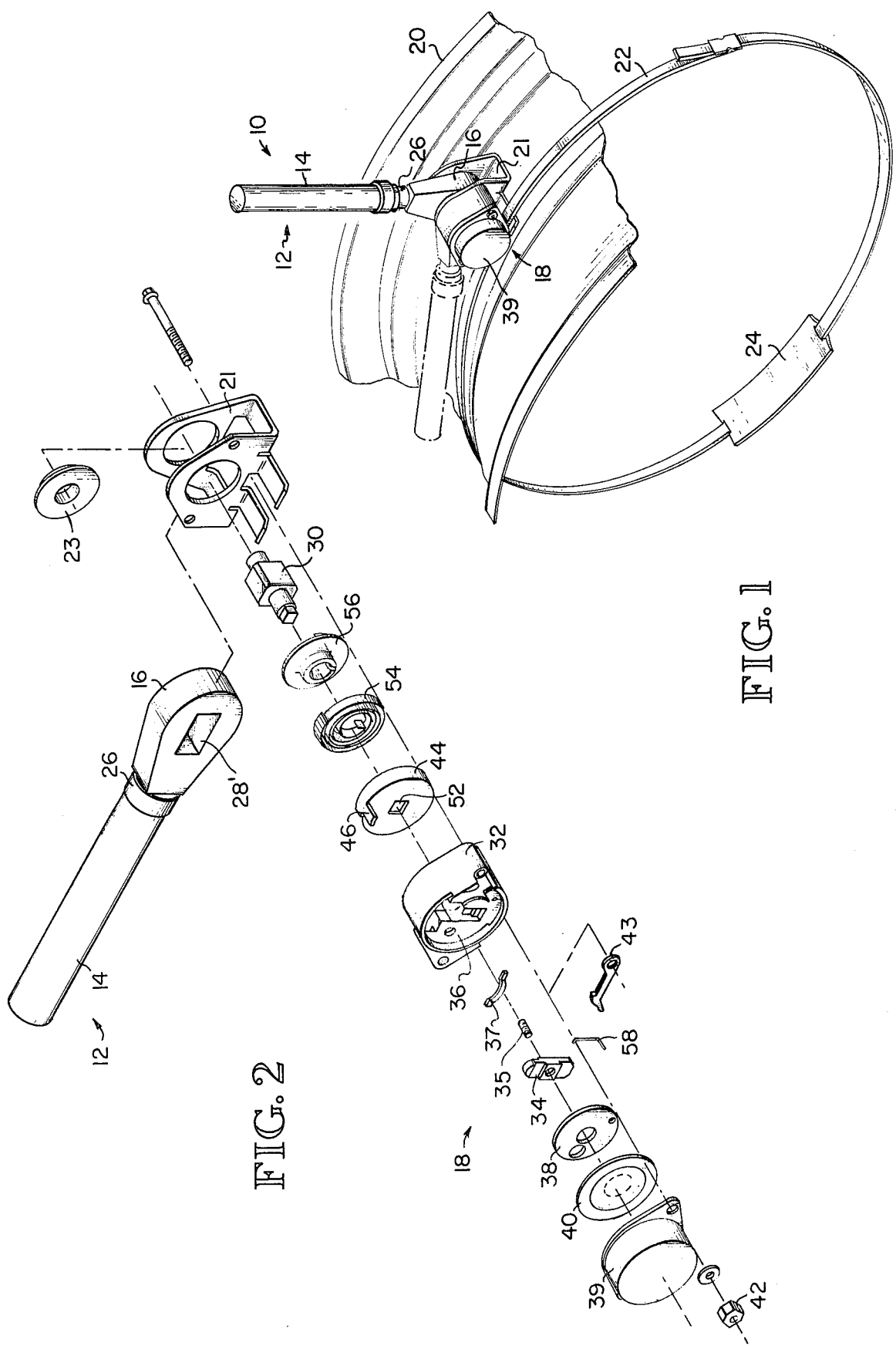

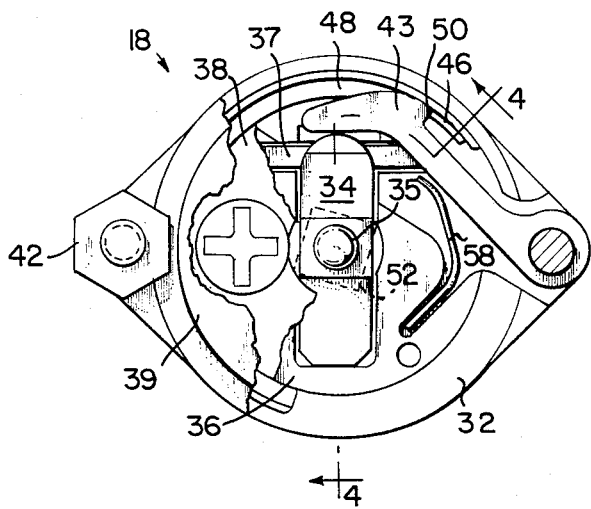
FIG. 3
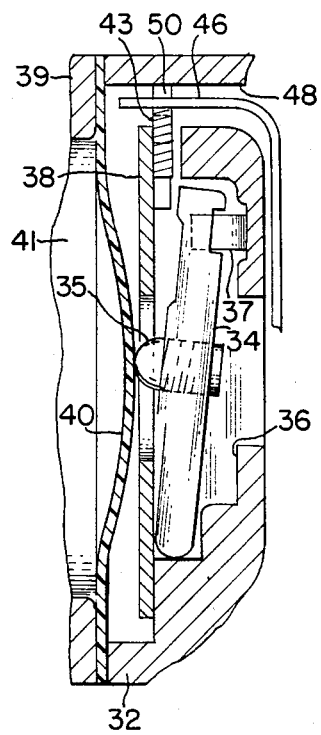
FIG. 4
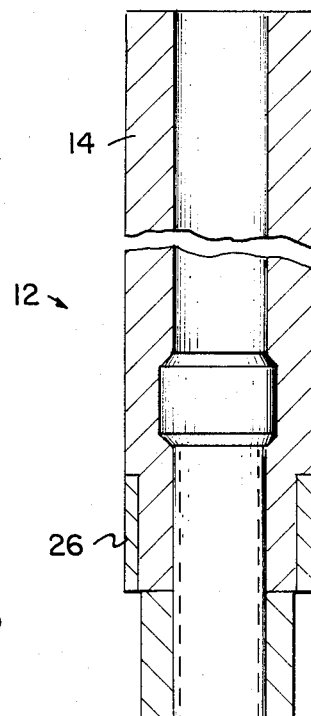
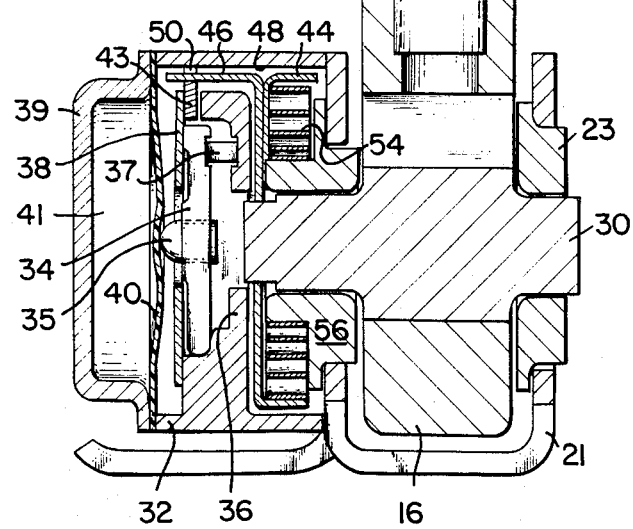
FIG. 5

PRESSURE-ACTIVATED LOW PRESSURE WARNING DEVICE

BACKGROUND OF THE INVENTION

1. Field of the Invention

The invention is a device for signaling to a vehicle driver an under-inflated condition in a tire.

2. Description of the Prior Art

Under-inflation of tires on passenger cars, trucks and other vehicles causes poor fuel economy by increasing rolling resistance, shortened tire life by increasing heat build-up, and a greater chance of accidents by decreasing the handling capabilities of the vehicle. This leads to unnecessary loss of life and injury to persons and property.

While tires today are manufactured for dependability and durability, leakage of air through and around the valve stem and bead seat is unavoidable. Because of the current trend toward self-service gas stations, a vehicle owner often must check and maintain proper tire inflation himself, or take the risks assocated with under-inflation. Because many drivers lack either the knowledge, time or motivation to check and maintain proper tire pressure, a passive device is needed which will inform a driver of a low pressure condition in a tire without his making a conscious effort to detect the condition. Ideally, such a device would also offer the driver motivation to correct a low pressure condition by, for example, persistently signaling to the driver until tire pressure is raised to the proper level. To achieve the greatest possible fuel economy, such a device should be sensitive to a small pressure drop of about 5 psig. Finally, the device should be easily installed on wheels already in use and should not interfere with tire mounting or weaken the structure of the tire. Since a single vehicle's underinflated tire will undermine the safety of all surrounding persons and property, as well as contribute to fuel shortages felt by all, a cost low enough to ensure widespread use of the device is essential.

Prior art devices have not generally met these standards. Active valve stem indicators detect only gross changes in tire pressure and require an effort by a driver who must make a visual observation of a gauge. A driver can easily forget to check the gauge or ignore its indication of low pressure, in which case the device does not achieve its purpose.

Electronic low pressure indicators have been proposed, but would be too costly for widespread use by the driving public.

Low pressure warning devices which detect deformation in a tire's side wall interfere with the integrity of a tire's structure, are not easily installed on tires already in use, and make tire mounting difficult.

SUMMARY OF THE INVENTION

The present invention relates to a device for indicating a tire pressure drop or low pressure condition. Means are provided for detecting a pressure drop and for making an acoustic signal in response to the detection of the pressure drop by the detecting means. For example, the device of the invention may include means, such as a strut, for intermittently contacting a wall of a tire, means, such as a striker, for producing an acoustic signal in response to the contacting means, and latch means for preventing the contacting means from contacting the wall of the tire when the pressure in the tire is above a predetermined value.

The present invention can detect a small drop in tire pressure and inform a vehicle driver of the low pressure condition without his taking any independent action. The invention will motivate a correction of the condition by its persistent signaling until the tire is reinflated. This signaling will occur over a wide range of vehicle speeds, making it certain to attract attention to the underinflation problem until the tire is reinflated.

The present invention, since it has minimal contact with the tire, will not interfere with the interior of the tire and sealant coatings thereon, or weaken the tire structure. The latching of the strut when the tire is properly inflated is advantageous in its minimizing tire contact, as well as ensuring that false signals will not be generated because of tire deformation caused by circumstances other than underinflation.

The present invention, being a simple mechanical device, can be made available to the public at a very low cost, ensuring widespread consumer acceptance and use of the device.

BRIEF DESCRIPTION OF THE DRAWING

FIG. 1 is a perspective view of a first embodiment of the invention mounted on a wheel rim;

FIG. 2 is an exploded view of the first embodiment;

FIG. 3 is a cross-sectional view showing the details of the pressure-sensitive latch of the first embodiment;

FIG. 4 is a partial sectional view of the pressure sensitive latch of the first embodiment in the unlatched position taken along line 4—4 of FIG. 3;

FIG. 5 is a sectional view of the latch of the first embodiment in the latched position taken along line 4—4 of FIG. 3.

DETAILED DESCRIPTION OF THE DRAWINGS

Figure 6:
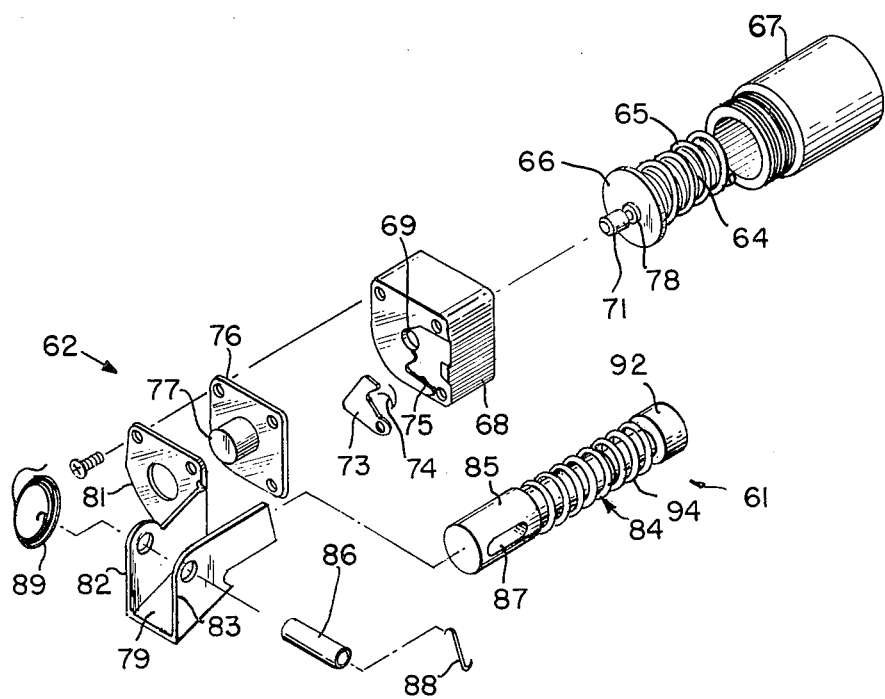
FIG. 6 is an exploded view of the second embodiment of the invention.

Referring to FIG. 1, the first embodiment of the low pressure warning device 10 includes two major components: a signal generating mechanism 12, having a strut 14 mounted on a striker 16; and a pressure-sensitive latching mechanism 18 which, when pressure in the tire is above a predetermined level, will hold the signal generating mechanism 12 against the wheel rim 20, as shown in phantom. When tire pressure drops below the predetermined level, the latching mechanism 18 will unlatch the signal generating mechanism 12, and allow it to pivot outward under the influence of centrifugal force, caused by wheel rotation.

The warning device 10 is most conveniently mounted by a generally U-shaped bracket 21 having two uprights between which the striker 16 is received. Two prongs extend from the web of the bracket 21 to receive a metal strap 22 having attached thereto a lead plate 24 or the like which acts as a counterweight to balance the weight of the warning device 10 on the tire rim. In the illustrated embodiment, the strap 22 surrounds the wheel rim 20 at its drop center, but it will be understood that the device 10 may be welded or otherwise attached to the wheel rim 20; alternately, external counterweights may be employed.

Referring to FIGS. 2-5, the signal generating mechanism 12 includes a resilient elastomeric strut 14 comprising, for example, a length of flexible hose attached to a metal striker 16 by means such as a band or clamp 26 of conventional design. An elastomeric strut is advantageous because it will withstand considerable flexural deflection caused by the wheel traveling over an obstacle such as a curb, will not damage the tire interior; additionally, it is light weight and inexpensive. The striker 16 has in its body an elongated rectangular slot 28 extending in a direction parallel to the length of the strut 14, through which a slide pin 30 is inserted for reasons to be described below. Bushing 23, adjacent one side of the striker 16, and the latching mechanism 18 on the other side, retain the slide pin 30 within the slot 28.

Turning now to the pressure-sensitive latching mechanism 18, a housing 32 holds an elongated release plate 34 having an adjustable set screw 35 threadedly engaged in its center portion. The housing 32 includes a generally circular center core 36 for mounting the various elements of the latching mechanism. The core 36 may be formed integral with the housing walls as, for example, a casting or may be otherwise attached to the housing walls. Between the top end of the relase plate 34 as viewed in FIGS. 2–5 and housing core 36 is a spring 37 which forces the top end of the release plate 34 away from the housing core. In front of the release plate 34 is an annular cover plate 38, and in front of that, a deformable diaphragm 40. It is understood, of course, that in this and all other embodiments which include a diaphragm, the material, geometry, and construction of the diaphragm are chosen to give the desired deformation at the predetermined threshold level of tire pressure, by means well known in the art. A cup 39 hermetically sealed to the diaphragm 40 by means well-known in the art, forms a sealed chamber 41 of reference pressure in front of the diaphragm. The cup 39 may be clamped to the housing by such means as the clamping nuts 42 so as to engage the diaphragm with the set screw 35.

It will be understood, of course, that the internal portion of the housing 32 is subjected to tire pressure and when pressure in the tire is below the predetermined threshold level, the diaphragm 40 will, as shown in FIG. 4, assume its original domed shape and move outward from the chamber 41 to push against the set screw 35, forcing the top end of the release plate 34 to pivot back toward the leaf spring 37. At tire pressures above the threshold level, the diaphragm 40 is forced to deform as shown in FIG. 5, and the release plate 34, under the influence of leaf spring 37, is urged to a position where it will prevent movement of the free end of the latch 43. The latch 43 may be pivoted to the housing 32 by means of one of the mounting bolts passing through the housing as shown most clearly in FIGS. 2 and 3. A circular cup 44 rests against the opposite side of the housing 32, and a tab 46 on the cup extends through an arc-shaped slot 48 in the housing core 36, concentric with the cup 44, to abut against a shoulder 50 on the latch 43. Thus, with the pressure above the predetermined threshold level, the release plate 34 blocks movement of the latch 43. This in turn prevents rotation of the cup 44.

In the center of the cup 44 is a square hole 52 through which a square end of the slide pin 30 is inserted. That part of the slide pin 30 which engages the rectangular slot 28 in the striker 16 is also square or, alternatively, rectangular, with its sides abutting the sides of the slot 28. As a result, restraining rotation of the cup 44 will restrain rotation of the slide pin 30 and thus striker 16 mounted thereon.

When tire pressure drops below the predetermined threshold level, the diapharagm 40 will assume a dome-like shape, as shown in FIG. 4, curving outward from the chamber 41, and pressing the release plate 34 toward the housing core 36. The latch 43 is then free to rotate radially inward and pivot downward in front of the release plate 34. If the wheel upon which the warning device 10 is mounted is in motion, the centrifugal force due to the spinning of the wheel rim 20 will urge the strut 14 radially outward in the plane of rotation. Since the release plate 34 does not block movement of the latch 43 when the tire pressure is below the predetermined threshold level, the tab 46 on the cup 44 can rotate pass the now unrestrained latch 43, allowing the cup 44, striker 16 and strut 14 to rotate to a radial position.

With the striker 16 and strut 14 rotated to their radial position, the device will signal the pressure drop to the driver. As the underinflated tire rotates, that part of its tread which contacts the ground is deformed inward, forming a flat spot even if the tire is near proper inflation. The length of strut 14 is chosen so that, while it will not contact an undeformed portion of the tire, it will contact the interior of the circumferential wall of the tire when the wall is deformed into a flat spot. This contact will force the strut 14 radially inward, causing the striker 16 to slide inward due to the slot 28 and slide pin 30 arrangement, and impact against the wheel rim 20, creating an acoustic signal. As shown in FIGS. 1 and 2, mounting bracket 21 preferably will not extend between the wheel rim 20 and striker 16, although a portion of the mounting bracket 21 could, alternatively, act as an anvil to receive the impacts of the striker 16 if desired.

When rotation of the tire ceases, centrifugal force no longer acts upon the strut 14, and a power return spring 54, having one end held in a fixed position relative to the cup 44 by a slotted bushing 56, and the other end attached to the cup 44, will then force the strut 14 and striker 16 back to their stowed position, with the strut 14 approximately tangent to the wheel rim 20. This will result in the cup 44 being rotated back to its original position.

A hair spring 58 is positioned in a groove in the housing core 36 to urge the latch 43 back up to its original position as illustrated in FIG. 3. If pressure in the tire is now increased to a point above the threshold level, the diaphragm 40 will return to its deflected configuration, relieving the pressure on the release plate 34, and leaf spring 37 will force the release plate back to its latch-restraining position. Thus, stopping the vehicle will result in the strut 14 returning temporarily to the stowed position, and increasing the tire pressure to the appropriate level will result in the strut 14 being re-latched in this position, resetting the device. Otherwise, the strut 14 and striker 16 will remain free to rotate outward to their radial position when the vehicle again is in motion.

Using such a pressure responsive latching device, the invention can, by proper choice of a diaphragm 40, be constructed to detect a drop in tire pressure as small as 3 to 5 psig. A pressure drop of this size, while it may not lead to a flat tire, will impair fuel economy and the detection of such a drop is therefore highly avantageous.

Although the above embodiment is described with a diaphragm used as the pressure sensing element, it will be understood that other pressure sensing means, such as a pressure sensitive bellows, can be used as the pressure sensing element in this and other embodiments.

FIG. 6 shows an example of the use of a bellows in a latching mechanism. In this embodiment, the device 61 has a latching mechanism 62 which includes a bellows 64 exposed to tire pressure and surrounded by a preload spring 65 which bears against a face plate 66 and a cylindrical housing 67 in which the bellows 64 is contained. Threadedly engaged with the housing 67 is a cap 68 having an aperture 69 through which a projection 71 on the face plate 66 extends.

An arm 73 attached to a corner of the outer side of the cap 68 pivots in the plane of the cap's surface to a position where the arm abuts the projection 71, and is biased away from the projection 71 by a hair spring 74 bearing between the arm 73 and a ledge 75 on the cap 68. A cover plate 76, having a cylindrical cavity 77 into which the projection 71 fits, covers the assembly on top of the cap 68.

A strut mounting bracket 79 is affixed to the latching mechanism 62. The bracket 79 has an extension 81 which fits over the cover plate 76, and holds a pair of upright members 82 and 83 parallel to the axis of the bellows 64. A strut 84 having at one end a striker poriton 85 which is received between the two uprights 82 and 83, in a manner similar to the previously described embodiment, pivots on an axle 86 extending through the uprights and an elongated slot 87 in the striker portion 85, and fastened therein with a keeper wire 88. A return spring 89 has one end held fixed relative to the strut 84 and the other coupled with the striker portion 85 for a reason to be explained below.

In operation, when tire pressure is above a predetermined threshold, the bellows 64, which has therein a reference pressure chosen with the threshold level as the criterion, is contracted. The arm 73 is held out from the center of the cap 68 by the projection 71, and in this position the arm extends out from the edge of the cap 68 over the strut 84 in the stowed position to retain it in this position. When pressure drops below the threshold level, the bellows 64 will expand, and a narrowed portion 78 of the projection 71 adjacent the face plate 66 will then extend through the aperture 69. This allows the arm 73 to pivot inward toward the center of cap 68. Centrifugal force due to the rotation of the wheel rim will force the strut 84 outward to a radial position, since pivotal movement of the strut 84 is no longer restrained by the arm 73.

If the low pressure condition in the tire is corrected, the bellows 64 will assume its original contracted configuration. Hairpin spring 74 will force the arm 73 outward, and projection 71 will block inward movement of the arm 73. When the vehicle is stationary, return spring 89 will force the strut 84 to slip over the arm 73, to be latched thereby in the stowed position.

In this embodiment, the strut 84 includes a striker portion 85 through which the axle 86 extends, and a tire contacting portion 92 telescopingly engaged in the striker portion 85, with a spring 94 acting between the two and bearing between an edge of the striker portion 85 and the tire contacting portion 92. When the strut 84 is in the radial position, the tire contacting portion 92 will contact the flat spot of the tire and be forced inward thereby, forcing the striker portion 85 to slide inwardly on the axle 86 to impact against the mounting bracket 79 and create an audible signal. Additional compression of strut 61 is accommodated by compression of the spring 84. A portion of the mounting bracket 79 can be removed to allow direct contact between the strut 84 and wheel rim, as in the previously described embodiment.

Although the invention has been described with respect to specific embodiments and specific uses therefor, it will be understood that modifications in the structure or usage may be made without departing from the scope of the invention.

What is claimed is:

1. A device for indicating a pressure drop in a load-bearing, rotating pressurized vessel comprising, in combination:

means mountable inside said vessel for sensing a pressure drop in said vessel below a predetermined level; and acoustical signal producing means mountable inside said vessel and being enabled to produce an acoustical signal when said pressure drop sensing means senses a pressure drop below the predetermined level, said signal producing means being maintainable in a non-signal producing position by said pressure drop sensing means only when pressure in said vessel is above the predetermined level.

2. A device for indicating a pressure drop in a load-bearing, rotating pressurized vessel comprising in combination:

acoustical signal generating means mountable inside said vessel on an iternal surface thereof;

said acoustical signal generating means having a normally restrained non-signal first position when the pressure in said vessel is above a predetermined level and a released signal generating second position when the pressure in said vessel is below said predetermined level; and pressure responsive means mountable inside said vessel for holding said acoustical signal generating means in said first position responsive to pressure in said vessel above said predetermined level and releasing said signal generating means when the pressure therein falls below predetermined level.

3. The device of claim 2 wherein:

said pressurized vessel comprises a pneumatic tire and wheel assembly; and said ascoustical signal generating means comprises striker means mounted on the rim of said wheel, means for impacting said striker means upon rotation of said tire when striker means is in the second position, and strut means connected to said striker means for contacting a portion of the wall of said vessel during rotation to activate said striker means when the striker means is in the second position.

4. A device for indicating a low pressure condition in a load-bearing rotating pneumatic vessel comprising:

means mountable inside the vessel for intermittently contacting a wall of the vessel when said low pressure condition exists;

means mountable inside the vessel for preventing the contacting means from contacting the wall when the pressure in the vessel is above a predetermined limit; and means for producing an acoustic signal in response to the contacting means contacting the wall.

5. A device for indicating a low pressure condition in a pneumatic tire and wheel assembly comprising:

means for contacting the circumferential inner wall of the tire when said low pressure condition exists;

means for producing an acoustic signal in response to the contacting means contacting the tire;

means for mounting the contacting means to the rim of said wheel; and means for holding the contacting means adjacent the rim of said wheel where it is restrained from contacting said circumferential inner wall of the tire when the pressure in the tire is above a predetermined limit, whereby contact with the circumferential wall of the tire is prevented.

6. The device of claim 5 wherein the contacting means is pivotally mounted to the rim of said wheel.

7. A device for indicating a low pressure condition in a tire and wheel rim assembly, comprising:

a strut which is movable between a first position in which it extends radially from the wheel rim toward the interior surface of the tire tread, and a second position in which it is tangential to the wheel rim;

means for creating an acoustic signal in response to contact between the strut and the tire; and means for holding the strut in the second position while the pressure in the tire is above a predetermined limit, whereby contact between the strut and the tire is prevented.

8. The device of claim 7 wherein the means for creating an acoustic signal comprises:

an impacting body mounted on the inner end of the strut; and means for allowing movement for the strut radially inward.

9. The device of claim 7 wherein the strut comprises an elastomeric strut.

10. The device of claim 7 wherein the strut comprises a tire contacting portion, an impacting body telescopingly engaged with the tire contacting portion, and resilient spring means acting between the tire contacting portion and impacting body.

11. The device of claim 7 or 8 wherein the means for holding the strut in the second position comprises:

a latch which in its latching position holds the strut in the second position; and means for releasing the latch when pressure in the tire is below the predetermined limit.

12. The device of claim 11 wherein the means for releasing the latch comprises pressure sensing means and means responsive to the pressure sensing means for moving the latch from its latching position.

13. The device of claim 12 wherein the pressure sensing means comprises a diaphragm.

14. The device of claim 12 wherein the pressure sensing means comprises a diaphram which deforms when pressure falls within a predetermined range.

15. The device of claim 12 wherein the pressure sensing means comprises a bellows.

16. A device for indicating a pressure drop in a rotating tire and wheel assembly which form a pressurized vessel therebetween comprising, in combination:

means for sensing a pressure drop in said pressurized vessel below a predetermined level;

impact signal generating means enabled to provide for producing an acoustical signal by permitting the impact of two surfaces against each other when said pressure drop sensing means senses a pressure below said predetermined level; and means for mounting said sensing means and said acoustical signal producing means inside the pressurized vessel.

* * * * *

UNITED STATES PATENT AND TRADEMARK OFFICE
CERTIFICATE OF CORRECTION

PATENT NO. : 4,487,154

DATED : December 11, 1984

INVENTOR(S) : James M. Daly, et al

It is certified that error appears in the above-identified patent and that said Letters Patent is hereby corrected as shown below:

Column 4, line 14, delete "pass" and insert --past-- in its place.

Column 6, line 41, insert --a-- before "predetermined.".

line 48, insert --said--before "striker means."

Column 7, line 30, delete "for" and insert --of-- in its place.

Signed and Sealed this

Twenty-third Day of July 1985

[SEAL]

Attest:

DONALD J. QUIGG

Attesting Officer   Acting Commissioner of Patents and Trademarks